Jan. 5, 1965     F. H. MILLER, JR     3,164,080
BAG PALLETIZER

Filed June 9, 1961     4 Sheets-Sheet 1

INVENTOR.
FRANK H. MILLER, JR.
BY
*William R. Price*
ATTORNEY

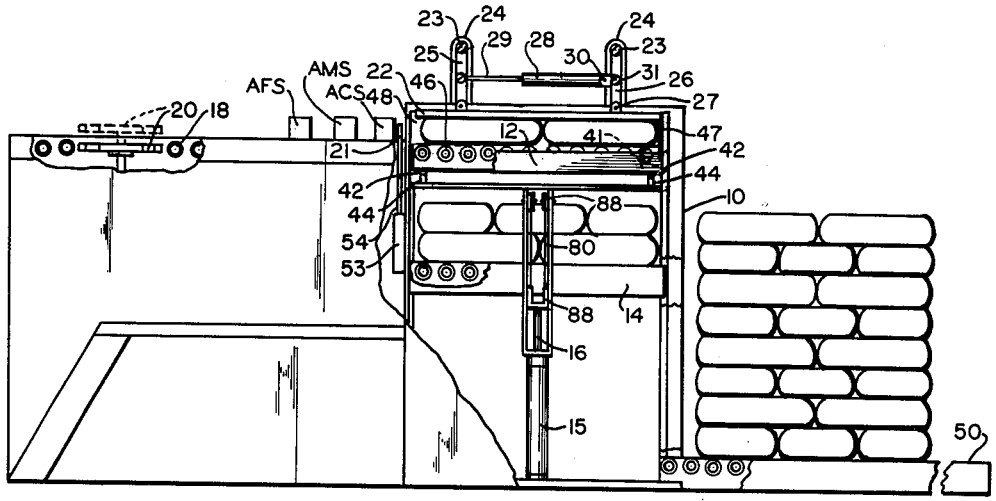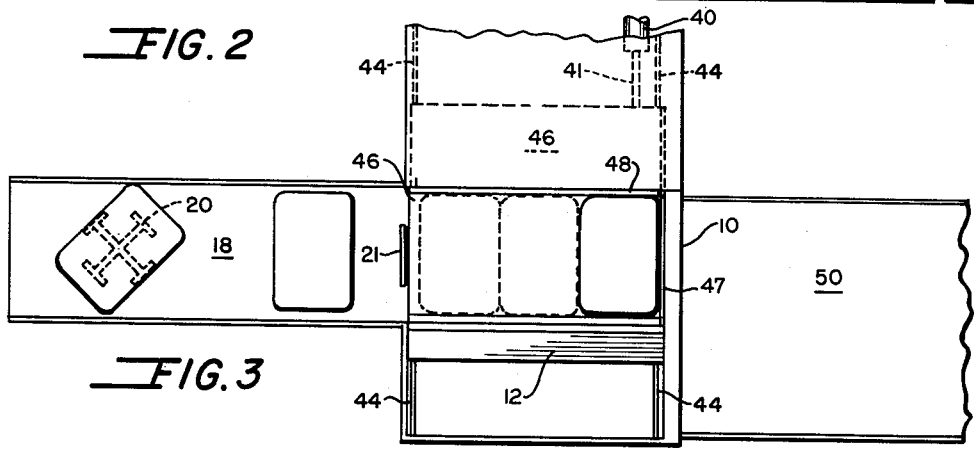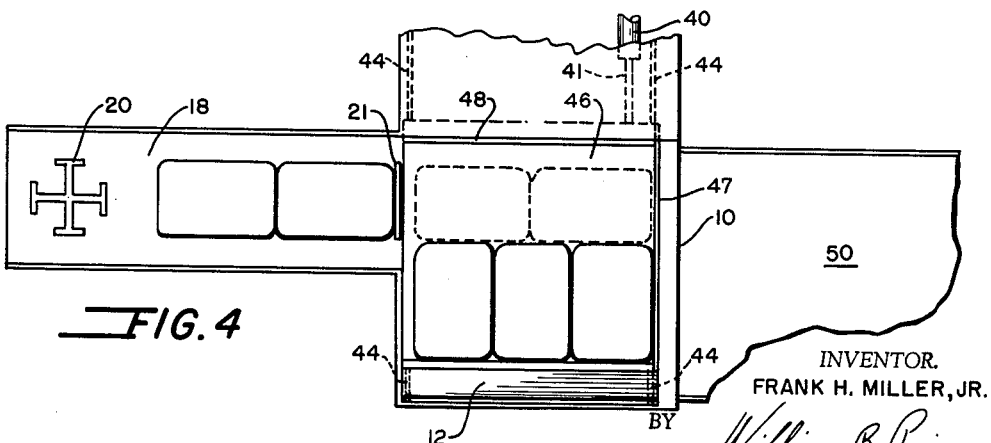

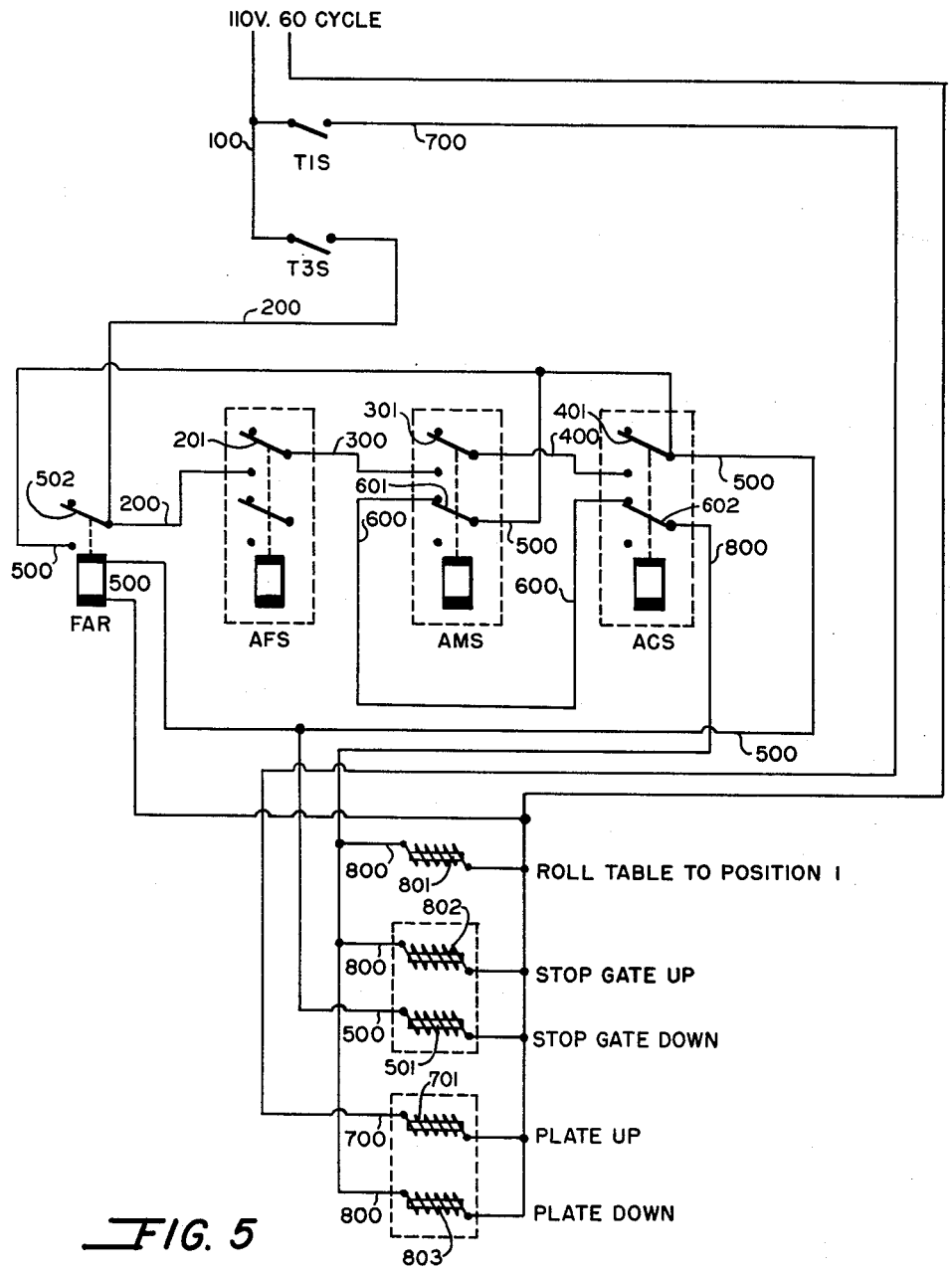

Jan. 5, 1965  F. H. MILLER, JR  3,164,080
BAG PALLETIZER

Filed June 9, 1961  4 Sheets-Sheet 4

INVENTOR.
FRANK H. MILLER, JR.
BY
ATTORNEY

United States Patent Office 3,164,080
Patented Jan. 5, 1965

3,164,080
BAG PALLETIZER
Frank H. Miller, Jr., Louisville, Ky., assignor to Miller Engineering Corporation, Louisville, Ky., a corporation of Kentucky
Filed June 9, 1961, Ser. No. 116,062
11 Claims. (Cl. 100—35)

The present invention relates to material handling apparatus, and more particularly to palletizers. More specifically, this invention relates to a machine for loading pallets with bags of material, in a desired pattern.

A goodly portion of the materials, processed by the materials handling industry, involves the use of pallets. Pallets are portable platforms usually having a dimension of approximately 4 by 5 feet and having an open frame work construction so that the tines of a fork lift truck may be inserted to lift and move the pallets together with their loads. The pallets are loaded in various article or unit arrangements to create what is termed "a locked load." In this manner, every layer of units creates an integrated locking element which tends to render the load resistant to accidental displacement. Thus, a pattern layer is formed which is placed upon the pallet. The next pattern layer is then reversed and this load placed upon the pallet. The pattern is alternately reversed until the pallet is loaded.

Manually forming a pattern of bags for loading pallets is a laborious task, requiring constant attention. Consequently, various machines have been developed and these are called palletizers. An example of this type machine is disclosed in my Patent No. 2,813,638 which issued November 19, 1957. Other machines of this character are described in my copending application, Serial No. 791,166, filed February 4, 1959, now U.S. Patent No. 3,045,802. These and other palletizing machines have many features in common. Thus, these machines are fed by conveyors and the rectangular objects are normally selectively turned so as to form a particular pattern in a stripping area. The stripping area may be a smooth metal plate, a roll table or similar device which, when retracted, allows a layer of articles to be placed on a pallet on an elevator, which is incrementally lowered and another layer deposited thereon until a pallet load is obtained. As previously stated, the alternate patterns are mirror images, so as to form a "locked load." All of the machines utilize means for selectively turning the package so as to form the pattern layer. Thus for example, a grid, which picks up the package, turns it 90° at desired intervals to form a patterned layer on the stripping table or a splitter to selectively divert the packages to chutes which approach a stripping area at right angles to the main flow of packages have been utilized. Other methods of rotating packages involve the use of deflector rails and rotate pins. These methods have all proved satisfactory for use with cartons. However, the performance obtained in palletizing bags has not been satisfactory in all cases. Thus, for example, if dense materials such as Portland cement, or gypsum plaster, packaged in paper bags are rotated through the use of a deflector rail and rotate pin, there is considerable danger of puncturing the bag or bending it around the pin, causing deformation. The use of splitters in stripping areas fed by gravity loaded chutes is all but precluded with materials of this character since the gravity propelled bags tend to break upon contact with the splitters or with the restraining walls of the loading area. The positive action as afforded in the Hynson device, U.S. Patent No. 2,780,340, wherein the bag is picked up and turned 90° have proved successful in handling paper bags containing some materials. However, it has been impossible, heretofore, to automatically palletize bags containing materials which I prefer to describe as having a high interparticle friction. Some bags of materials as for example, granulated or cubed polyethylene, polyvinylchloride and other vinyl plastics have such a low interparticle frictional coefficient that there is a tendency for a deformed bag to rearrange itself into proper shape on a roller conveyor. These materials are not encompassed by the term indicated above. Other bagged materials as for example, Portland cement, powdered magnetite ore, iron oxide pigments, gypsum, diatomaceous earth and the like have a high angle of repose and according a high interparticle coefficient of friction. Thus, if these bags are deformed, the deformed area tends to remain.

The problem of deformability is affected by:
(1) How easily the bag is deformed.
(2) The linear speed of the bag through the machine i.e. the inertial effects of the bag striking a stop gate, deflector, pin turner, stripper, or other stationary element and,
(3) The extent to which the bag and its contents retain deformation.

In high speed palletizing operations, it is necessary that the bags move at a high linear speed in the neighborhood of 150 feet per minute or higher. Thus, since all the machines utilize stationary members of one type or another to turn, deflect, move and strip the bags, the bags are invariably deformed. If the material therein is characterized by a high interparticle friction, the deformed area remains and the pallet loading operation is impaired.

As the layers of bags are deposited on the elevator platform by reason of the roll table being removed from beneath said layer, the layer lodges on a previously deposited layer, and this in turn supports a succeeding layer as has been previously indicated. Now, if the top surface of the entire layer is non-planar, and non horizontal, succeeding layers are unevenly supported. This results in a cumulative tilting effect of the entire stack which might ultimately cause the stack to topple as successive layers are added. Thus, unless the top surface of each layer of bags in the stack is maintained in a flat horizontal plane, the height and stability of the entire stack is impaired.

It is an object of this invention, therefore, to provide a machine which will automatically load deformable rectangular objects onto pallets.

A further object of this invention is the provision of apparatus designed to form a tier of bags in which the top surface of said tier is flat and horizontal.

Another object of this invention is the provision of a method and means for redistributing the material in individual bags in a patterned layer so as to effect a proper shape of the individual bags and a horizontal planar surface of the entire layer.

Other objects and advantages of the present invention will become apparent from a review of the accompanying drawings and the following detailed description.

Referring now to the drawings:

FIG. 2 is a side elevation of the machine.

FIGS. 3 and 4 are partially diagrammatic plan views of the machine of this invention which illustrate the formation of a patterned layer of bags thereon.

FIG. 5 is a diagram of the electrical control circuit of this machine.

*Mechanical Arrangement*

Figure 1:
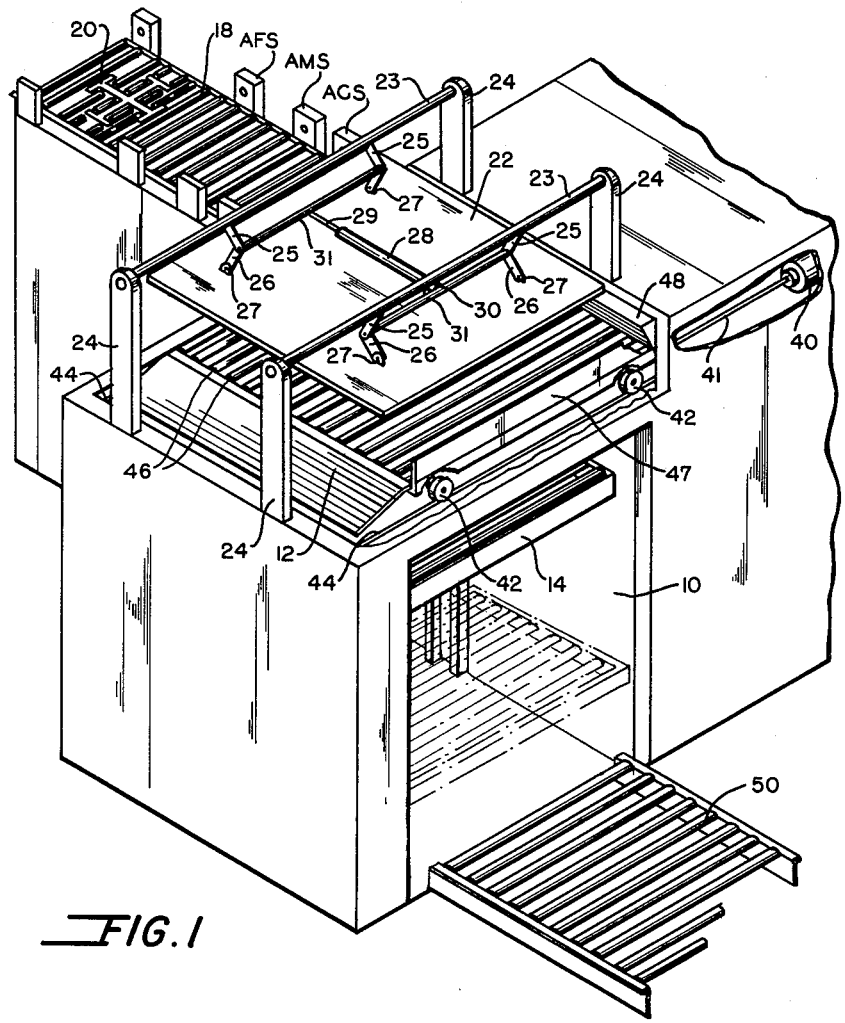
FIG. 1 is an isometric view illustrating a palletizing machine which embodies the features of my invention.

The machine of the present invention is adapted to receive bags from a supply source and dispose same on a pattern forming area, or roll table, a row at a time. The bags, comprising one of the rows, are selectively turned so as to be axially at right angles to the bags in the other row. The row containing the turned bags is alternately changed so that mirror image patterns are formed. The illustrated mechanism for turning the bags is a modification of the grid disclosed and claimed by Hynson in 2,780,340 and does not, of itself, form part of this invention.

The illustrated pattern area is a retractable roll table onto which the bags are transported. The table has three positions; fully retracted, fully extended, and partially extended. Thus, after the table is loaded with a patterned layer of bags, it is fully retracted so that the layer of bags retained by the stripper bar is deposited on the elevator platform. This is position, 1; i.e., with the roll table fully retracted. The table then is partially extended (position 2—FIG. 3), to receive the next row of bags and then fully extended (position 3—FIG. 4), to receive a second row of bags to complete the pattern. These last two positions are illustrated in FIGS. 3 and 4.

As is common to most palletizing machines, after the patterned layer is deposited onto the elevator platform, the elevator is lowered a distance corresponding to the height of the layer so as to receive the next layer. The roll table is again loaded with bags in the manner previously described and this load deposited. After a pallet load is obtained, on the elevator platform, the pallet then is pushed onto the pallet accumulator and a new pallet is fed onto the elevator platform, the elevator is then raised so as to receive its first layer of patterned bags.

As the roll table is retracted, the bag containing material having a high interparticulate friction, tend to push up against the abutment and the stripper bar. These members line the two edges of the roll table and are located at right angles to each other. The squeezing action pushes the bags against the stripper bar and into the corner formed by the abutment plate and the stripper bar. This tends to disrupt the pattern and weaken the "locked load" formed on the elevator platform. In instances where the bags are deformed by the turning apparatus or by the stop plate prior to entering the stripping area, there is a tendency for the bags to roll up or even break as they are restrained against the stripper bar or the abutment plate while the table is being retracted. This overcome by the apparatus of the present invention, which in the illustrated embodiment comprises a plate, mounted to be movable vertically, to and from the stripping area. Thus, after the table is loaded, the plate lowers and exerts pressure on the bags to redistribute the material in the deformed bags and establish the proper shape of said bags. In addition, the plate holds the entire layer of bags intact as the table is retracted and this prevents squeezing and deformation against the striper plate. Consequently, the layer which is deposited onto the elevator platform has a flat upper surface which is adapted to receive and support subsequent layers. As will be described in greater detail, the electrical control device simultaneously energizes the mechanism which lowers the plate and the mechanism which retracts the roll table. Normally, there is a lag in response of the roll table over the response of the plate, due to the difference in size of the fluid motors driving same, so that the plate is lowered an instant before the roll table beings to retract.

Structure

Referring now to the drawings, the machine of this invention comprises a supporting frame 10 on which is movably mounted a roll table 12. An elevator platform 14 is vertically movable in the frame and is driven by fluid motor 15. Roll conveyor 18 feeds bags some of which have been turned by turning grid 20 to stop gate 21. Stop gate 21 holds bags in engagement and allows accumulation on conveyor 18 while the roll table is moving to a different position.

Plate 22 is suspended by cross bars 23 mounted in brackets 24 and lever arms 25 and 26. Lever arm 26 is pivotably mounted in a clevis bracket assembly 27. The lever arms are connected together by connecting rod 31. Connected between the crossbars is pneumatic cylinder 28 and pneumatic ram 29, driven thereby. Pneumatic cylinder 28 is fastened at its base by assembly 30 to the connecting rod 31. The pneumatic ram 29 is attached to the other connecting rod 31. Upon extension of the pneumatic ram, the lever arms will be straightened to force plate 22 down onto the bags on the roll table 12. The pressure of the plate upon the bags redistributes the material therein and serves to reestablish the proper shape of the bags in the pattern. The roll table 12 is retractable riding upon supporting wheels 42 which ride on track 44 which is mounted on the upper part of frame 10. The roll table is driven by hydraulic cylinder 40 and double acting ram 41 which attaches onto the frame of the roll table. The rollers 46 of the table are rotated in unison by an electric driven motor and gear assembly not shown. At one end of the roll table is abutment plate 47 and at right angles thereto is stripper plate 48.

As the bags are fed onto the roll table 12, the motor driven rollers 46 will continue movement of said bags until they reach abutment plate 47. Upon complete loading of the roll tables, it is retracted by means of hydraulic ram 41. The bags are engaged against stripper plate 48, and are deposited upon elevator platform 14. The elevator platform 14 is vertically movable in the frame by cable means 80 attached at the four corners thereof and leading over pulleys (not shown), which are distributed within the frame 10. From there the cables fit around pulleys, not shown, arranged in the center of the frame, and then around pulleys or rollers 88, one set of which is attached to the frame and the other set is attached to ram 16. The cable 80 is anchored to said ram.

The roll table and elevator structure is substantially identical to that described in my Patent 2,813,638, and a more detailed description may be found therein.

As is illustrated in FIG. 2, after a pallet load is obtained, the pallet is pushed onto pallet accumulator 50. It will be noted also that stop gate 21 on conveyor 18 is driven by pneumatic cylinder 53 and ram 54.

FIG. 3 illustrates the roll table at position 2 with hydraulic ram 41 partially extended. Stop plate 21 is retracted, thus allowing the bags after being turned at turning station 20 to roll onto the outer portion of roll table.

In FIG. 4, the roll table is shown approaching position 3 with stop gate 21 still raised so as to engage the bags on accumulator conveyor 18. As soon as roll table 12 reaches position 3, stop gate 21 will be lowered and the bags will complete the pattern on the roll table. As soon as the pattern is complete, flattening plate 22 is lowered to apply vertical pressure on the bags. The flattening plate 22 thus holds the bags in position while roll table 12 is in the process of being retracted. This maintains a flat top surface across the entire layer. This is best illustrated in FIG. 2.

Figure 6:
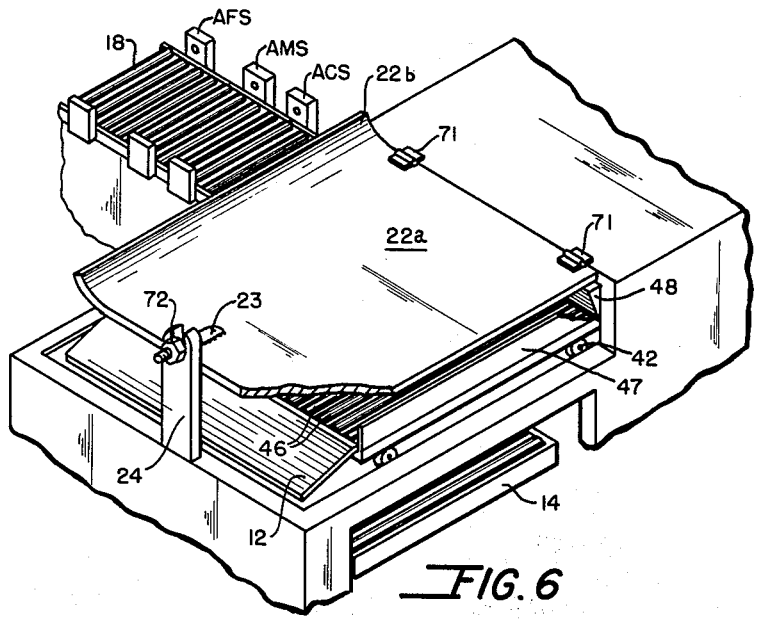
FIG. 6 is a fragmentary isometric view of the machine illustrating a modification of the plate member.

In FIG. 6, a modification of the plate, 22a, is illustrated. In this embodiment the plate is located in a stationary plane over the roll table and is attached by hinges 71 and bar 23 which fits into support 24. The upper edge 22b of the plate has been turned up so that there will be no danger of the bags catching or snagging as they are fed onto the roll table. Nut 72, on the end of bar 23 allows the plate to be securely engaged against support 24. By reason of hinges 71 the plate may be raised for easy access to roll table 12. This type of plate is best suited for bags made of cloth or extensible paper, as for example, crepe paper bags. These bags are somewhat flexible and tend to conform to the desired shape more readily than some other materials.

Figure 7:
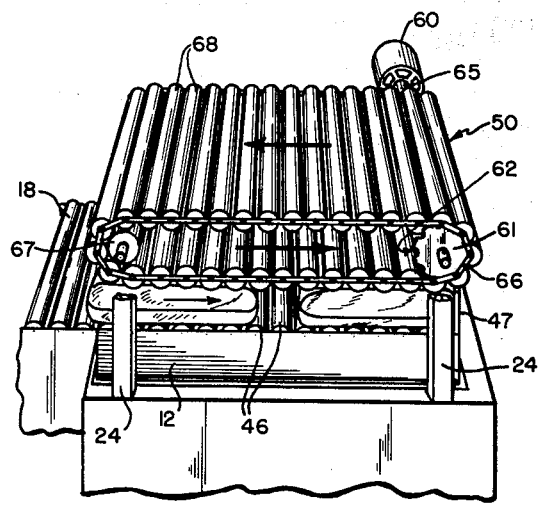
FIG. 7 is a fragmentary perspective view of the machine illustrating another modification in which an apron conveyor is substituted for the plate member of FIG. 1.

FIG. 7 illustrates another modification of the apparatus of this invention in which an apron conveyor 50 is substituted for the flattening plate 22. In this embodiment, the conveyor is driven by chain 66 in which the teeth of sprocket 61 engage. Sprocket 61 is on a shaft 65 at the outer edge of roller 62. The shaft is driven by motor 60. At the opposite of the apron conveyor is located idler roller 67. Both rollers are supported over roll table 12 by support 24.

The individual rollers 68 of the apron conveyor are freely rotatable so as to roll over the top of the bags on roll table 12. In addition, the apron conveyor tends to feed the bags onto the roll table so that the individual rollers 46 of the roll table need not be individually driven. The apron conveyor may be driven continuously or the motor 60 may be connected into the control circuit so as to be cut off periodically. In the drawing, the bags are shown in engagement with the rollers 68 of apron conveyor 50. This insures a flat upper surface of the layer of bags which is deposited on the elevator platform below roll table 12.

FIG. 5 shows the electrical control circuit of the machine. Briefly, the circuit utilizes a series of photo electric relays to control the flow of bags onto the accumulator conveyor 18 and roll table 12. These are illustrated as AFS or Accumulator Full Signal, AMS or Accumulator Median Signal and ACS Accumulator Clear Signal. These signals, AFS, AMS and ACS, are illustrated in normal position, i.e., light beam uninterrupted. Magnetic relay FAR or Full Accumulator Relay locks itself into the circuit so as to be energized by line 500.

In FIG. 1, ACS designates the light source on one side of the conveyor and the amplifier and relay on the other. However, in the diagram of FIG. 5 only the relay has been shown in the case of AFS, AMS and ACS.

In addition, the illustrated circuit is applicable only to positions 1 and 3 of the roll table since these are the only positions in which the plate 22 comes into play. In position 1 the roll table is fully retracted. In position 2 the roll table is partially extended (see FIG. 3). In position 3 the roll table is fully extended and fully loaded with a patterned layer of bags (see FIG. 4). Further, position 2 of the roll table involves other features such as the operation of grid 20, which does not of itself form part of this invention.

As has been previously indicated position 1 of the roll table is fully retracted. In this position limit switch T1S is tripped. This closes circuit 700 and the solenoid 701 is energized to actuate the valve to raise plate 22. The stop gate 21 being in its up position causes bags to accumulate on conveyor 18. When the conveyor 18 is fully loaded, the light beams controlling relays AFS, AMS and ACS are interrupted. The interruption of the light beams closes the normally open contacts 201, 301 and 401 of relays AFS, AMS and ACS, respectively.

When the roll table is in fully extended position 3, limit switch T3S is tripped, line 200 connects with relay FAR. Line 200 leads through the normally open, but now closed, contact 201 of relay AFS to line 300 which leads through normally open, but now closed, contact 301 of relay AMS to line 400 and then through normally open, but now closed, relay contact 401 of relay ACS to line 500. This energizes solenoid 501 to actuate the valve to lower the stop gate 21. The bags then move onto the roll table. Line 500 completes the circuit through contact 502 of relay FAR to 500 to interlock or seal in FAR. When the bags clear AMS, 601 of AMS closes to energize line 600 from hot line 500. When the bags clear ACS, 602 of ACS closes to energize line 800 from line 600. This energizes solenoids 801, 802, and 803 to actuate the valves to push roll table to fully retracted position 1, raise the stop gate up and push the plate down. The duration of the various contacts is in the order of less than a tenth of a second which, for practical purposes, is essentially instantaneous. As has previously been indicated, it is essential that plate 22 be lowered prior to retraction of the roll table. Since the cylinder 40 driving the roll table is much larger than the small pneumatic cylinder 28 and 53 which drive the plate 22 and stop gate 21 respectively, there is normally a lag of the roll table over the action of stop gate 21 and plate 22. However, if desired, a delay device can be incorporated in the line leading to the solenoid, which controls the roll table valve, to insure that the roll table does not retract prior to lowering of the plate 22 and raising of the stop gate 21. When the roll table 12 is withdrawn from its fully extended position 3, the limits switch T3S is opened and the holding circuit 500 is de-energized.

Many variations may be made in the arrangement of parts and in the control circuits. Thus, for example, a retractable stripper plate may be utilized instead of a roll table. The plate may be loaded from the side rather than the front. An arrangement might be incorporated whereby the elevator is raised against the stripper plate to reshape the bags of each successive layer by vertical pressure rather than lowering the plate against the bags. For an additional example, as each layer of bags is delivered from the roll table, or other pattern forming area or element, the elevator may be raised vertically from its layer receiving position to engage the top surface of the layer against the flattening plate, the flattening plate being in this case in a fixed location above the roll table. These and other variations will occur to those skilled in the art without departing from the spirit and scope of the present invention.

Having thus described my invention, what I claim and desire to reverse by Letters Patent is:

1. In a process for automatically loading bags onto pallets, in which a patterned bag layer is automatically transferred from a receiving member onto an elevator platform and in which the elevator platform is incrementally lowered to receive successive patterned bag layers; the improvement which comprises the steps of moving the receiving member away from said patterned bag layer so as to remove said receiving member from beneath said patterned bag layer, engaging the top surface of said patterned bag layer and applying vertical pressure thereto in order to maintain a horizontal planar surface on said patterned bag layer and to hold said patterned bag layer intact while the receiving member is being removed.

2. In a process for automatically loading bags onto pallets, in which a preselected pattern of bags is automatically transferred from a receiving member onto an elevator platform, and in which the elevator platform is incrementally lowered to receive successive patterned bag layers; the improvement which comprises the sequential steps of engaging the top surface of said patterned bag layer, applying vertical pressure thereto and horizontally retracting said receiving member to remove said receiving member from beneath said patterned bag layer to deposit same on said elevator platform, whereby a horizontal planar surface is maintained across the top of said patterned bag layer.

3. In a process for automatically loading bags onto pallets, in which a patterned bag layer is automatically transferred from a receiving member onto a pallet, said pallet being on an elevator platform and in which said elevator platform is incrementally lowered to receive successive patterned bag layers; the improvement which comprises the steps of bringing a flat plate into engagement with the top surface of said patterned bag layer, applying vertical pressure thereto and removing said receiving member from beneath said patterend bag layer to deposit said layer on said elevator platform, whereby a flat planar surface is maintained across the top of said patterned bag layer.

4. In a process for automatically loading bags onto a pallet in which a patterned bag layer is transferred from a receiving member onto a pallet, said pallet being on an elevator platform beneath said receiving member, and in which said elevator platform is incrementally lowered to receive successive patterned bag layers; the improvement which comprises the steps of bringing an apron conveyor into engagement with the top surface of said patterned bag layer so as to apply vertical pressure thereto and removing said receiving member from beneath said patterned bag layer to deposit said layer on said pallet, whereby a flat planar surface is maintained across the top of said patterned bag layer.

5. In a process for automatically loading bags onto a pallet in which a patterned bag layer is transferred from a retractable roll table onto a pallet, said pallet being on an elevator platform beneath said roll table, and in which said elevator platform is incrementally lowered to receive successive patterned bag layers; the improvement which comprises the steps of engaging the top surface of said patterned bag layer, applying vertical pressure thereto, horizontally retracting said roll table to remove same from beneath said patterned bag layer in order to deposit said layer on said pallet, whereby a flat planar surface is maintained across the top of said patterned bag layer.

6. In a process for automatically loading bags in which a patterned bag layer is transferred from a receiving member onto a pallet, said pallet being on an elevator platform beneath said receiving member, and in which said elevator platform is incrementally lowered to receive successive patterned bag layers; the improvement which comprises the steps of engaging the top surface of said patterned bag layer applying vertical pressure thereto, horizontally retracting said receiving member to remove said receiving member from beneath said patterned bag layer to deposit same on said pallet, bringing the receiving member back into position over said pallet and repeating said operation until a stable stack of bags is formed on said pallet.

7. A bag pallet loader which comprises in combination, a retractable receiving member for receiving a plurality of loaded bags, means for guiding a plurality of loaded bags onto said receiving member to form a layer of bags thereon, means for retracting said receiving member to discharge the layer of bags therefrom, elevator means for supporting a pallet beneath said receiving member; flattening means located above said receiving member in a plane parallel thereto and mounted for movement to and from said receiving member, driving means for said flattening means and control means for actuating the means for lowering of said flattening means and for actuating the means for retracting said receiving member from beneath said layer of bags, whereby the top surface of said layer is engaged by said flattening means while the receiving member is being removed from beneath said layer of bags.

8. A bag pallet loader, which comprises in combination, a horizontally retractable receiving member for receiving a plurality of loaded bags; means for guiding a plurality of loaded bags onto said receiving member to form a layer of bags thereon, a stop gate for halting the flow of bags onto the receiving member means for raising and lowering said stop gate, means for retracting said receiving member to discharge the layer of bags therefrom, elevator means for supporting a pallet beneath said receiving member; flattening means located above said receiving member in a plane parallel thereto and adapted to engage the top surface of said layer of bags in order to maintain a flat horizontal planar surface thereon and to hold said layer of bags intact while said receiving member is being retracted, and electrical control means for actuating the means for retracting said receiving member and for actuating the means for raising the stop gate while the receiving member is being retracted.

9. A bag pallet loader which comprises in combination, a retractable receiving member for receiving a plurality of loaded bags, means for guiding a plurality of loaded bags onto said receiving member to form a layer of bags thereon, a stop gate for halting the flow of bags onto the receiving member, means for raising and lowering said stop gate, means for retracting and extending said receiving member to discharge the layer of bags therefrom, elevator means for supporting a pallet beneath said receiving member, flattening means located above said receiving member in a plane parallel thereto and mounted for vertical movement to and from said receiving member, means for driving said flattening means, and control means for actuating the means for lowering of said flattening means, for actuating the means for raising the stop gate and for actuating the means for retracting said receiving member, whereby the top surface of said layer is engaged by said flattening means, while the receiving member is being removed from beneath said layer of bags.

10. A bag pallet loader which comprises in combination a horizontally retractable receiving member for receiving a plurality of loaded bags; means for urging a plurality of loaded bags onto said receiving member to form a layer of bags thereon, a stop gate for halting the flow of bags onto the receiving member, means for raising and lowering said stop gate, means for retracting and extending said receiving member to discharge the layer of bags therefrom, elevator means for supporting a pallet beneath said receiving member, flattening means located above said receiving member and in a plane parallel thereto, said flattening means comprising an apron conveyor, driving means for said apron conveyor and a support therefor, said apron conveyor being adapted to engage the top of said bags in such a manner as to feed said bags onto said receiving member and to maintain a flat planar surface on the top of said layer of bags and control means to actuate retraction of said receiving member and raising of said stop gate after a layer has been formed on said receiving member.

11. A bag pallet loader which comprises in combination, a retractable receiving member for receiving a plurality of loaded bags, means for urging a plurality of loaded bags onto said receiving member to form a layer of bags thereon, a stop gate for halting the flow of bags onto the receiving member, means for raising and lowering said stop gate, fluid motor means for retracting and extending said receiving member to discharge the layer of bags therefrom, elevator means for supporting a pallet beneath said receiving member, a plate located above said receiving member in a plane parallel thereto and mounted for vertical movement to and from said receiving member, fluid motor means for lowering and raising of said plate and control means for controlling the flow of bags onto said receiving member and for actuating the fluid motor means for raising the stop gate, lowering the plate and retracting the receiving member after a complete layer of bags has been received on said receiving member.

References Cited by the Examiner
UNITED STATES PATENTS

| | | | |
|---|---|---|---|
| 1,535,075 | 4/25 | Knap | 198—38 |
| 2,633,251 | 3/53 | Bruce | 53—62 |
| 2,655,271 | 10/53 | Cole et al. | 214—6 |
| 2,699,264 | 1/55 | Bruce et al. | 214—6 |
| 2,780,340 | 2/57 | Hynson | 214—6 |
| 2,813,638 | 11/57 | Miller | 214—6 |
| 2,907,447 | 10/59 | Offutt | 53—124 |
| 2,977,002 | 3/61 | Asp | 214—6 |
| 3,014,599 | 12/61 | Lawrence | 214—6 |

WALTER A. SCHEEL, *Primary Examiner.*

G. FORLENZA, *Examiner.*